Figure 1:
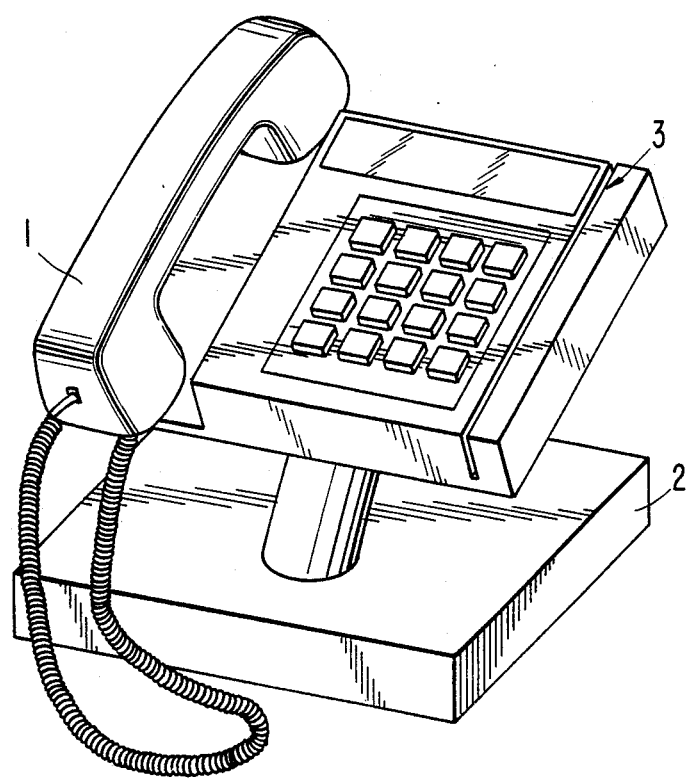

United States Patent [19]
Zebryk

[11] Patent Number: 4,975,942
[45] Date of Patent: Dec. 4, 1990

[54] CREDIT/CALLING CARD PAY TELEPHONE METHOD AND SYSTEM EMPLOYING TELEPHONE UNIT LOCAL CARD-CHECKING AND OTHER INTELLIGENCE COOPERATIVE WITH LOCAL PERSONAL HOST COMPUTER

[75] Inventor: Jay Zebryk, Southbridge, Mass.

[73] Assignee: The Boston Communications Group, Boston, Mass.

[21] Appl. No.: 384,166

[22] Filed: Jul. 21, 1989

[51] Int. Cl.⁵ .......................................... H04M 17/02
[52] U.S. Cl. ..................................... 379/144; 379/91; 379/155
[58] Field of Search ................... 379/144, 155, 91, 93, 379/106

[56] References Cited

U.S. PATENT DOCUMENTS

| | | | |
|---|---|---|---|
| 3,696,335 | 10/1972 | Lemelson | 340/149 |
| 3,723,655 | 3/1973 | Zucker et al. | 179/2 |
| 3,727,186 | 4/1973 | Stephenson, Jr. et al. | 340/149 |
| 3,982,103 | 9/1976 | Goldman | 235/61.7 |
| 4,731,818 | 3/1988 | Clark et al. | 379/91 X |

*Primary Examiner*—Stafford D. Schreyer
*Attorney, Agent, or Firm*—Rines and Rines

[57] ABSTRACT

A credit/calling card pay telephone method and system, employing appropriate expanded local intelligence at the telephone instrument unit for enabling local card checking and call transaction record keeping, and interfacing with a PC host computer periodically automatically to transmit batches of such records to the computer for locally generating customer billing thereat.

11 Claims, 4 Drawing Sheets

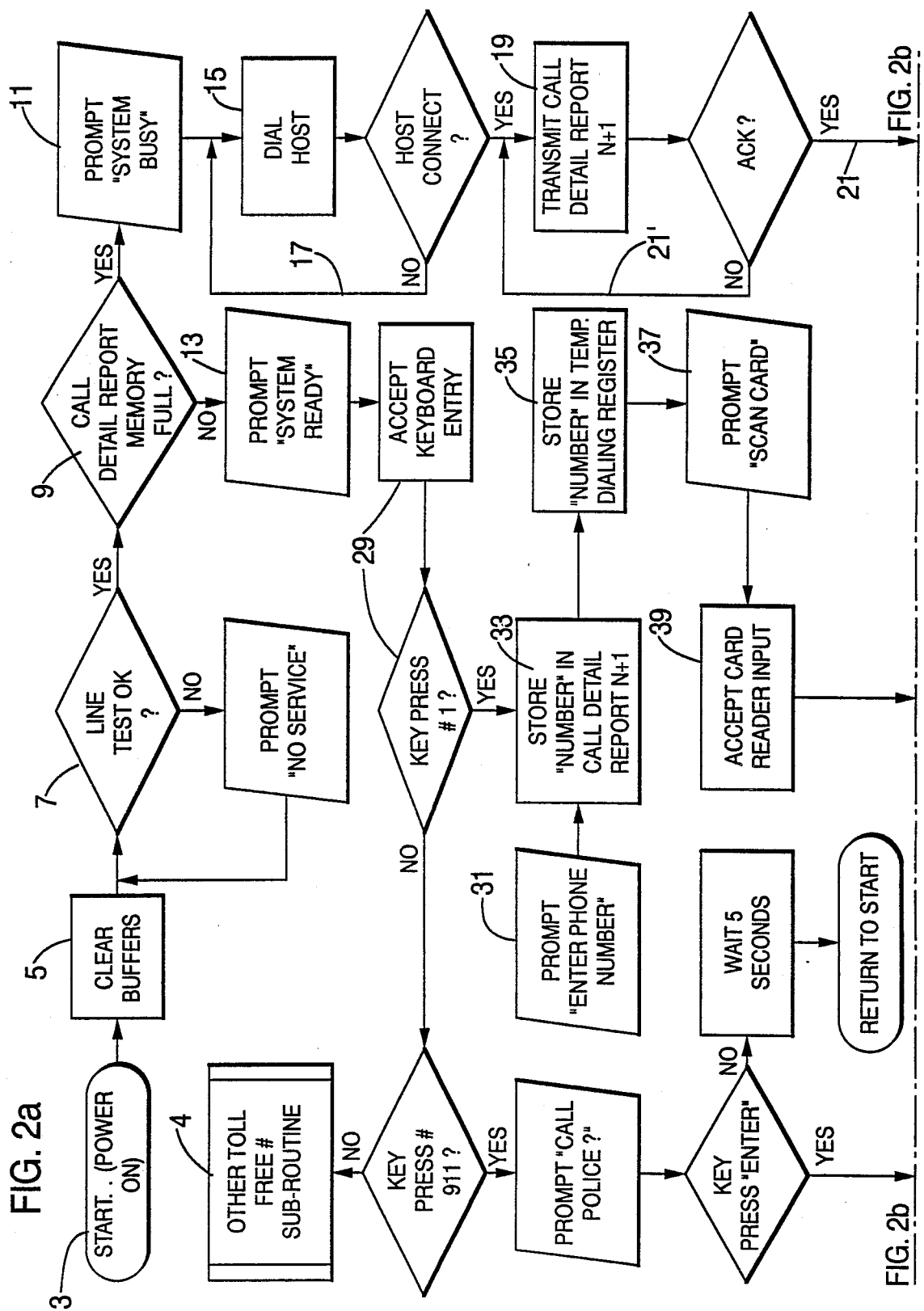

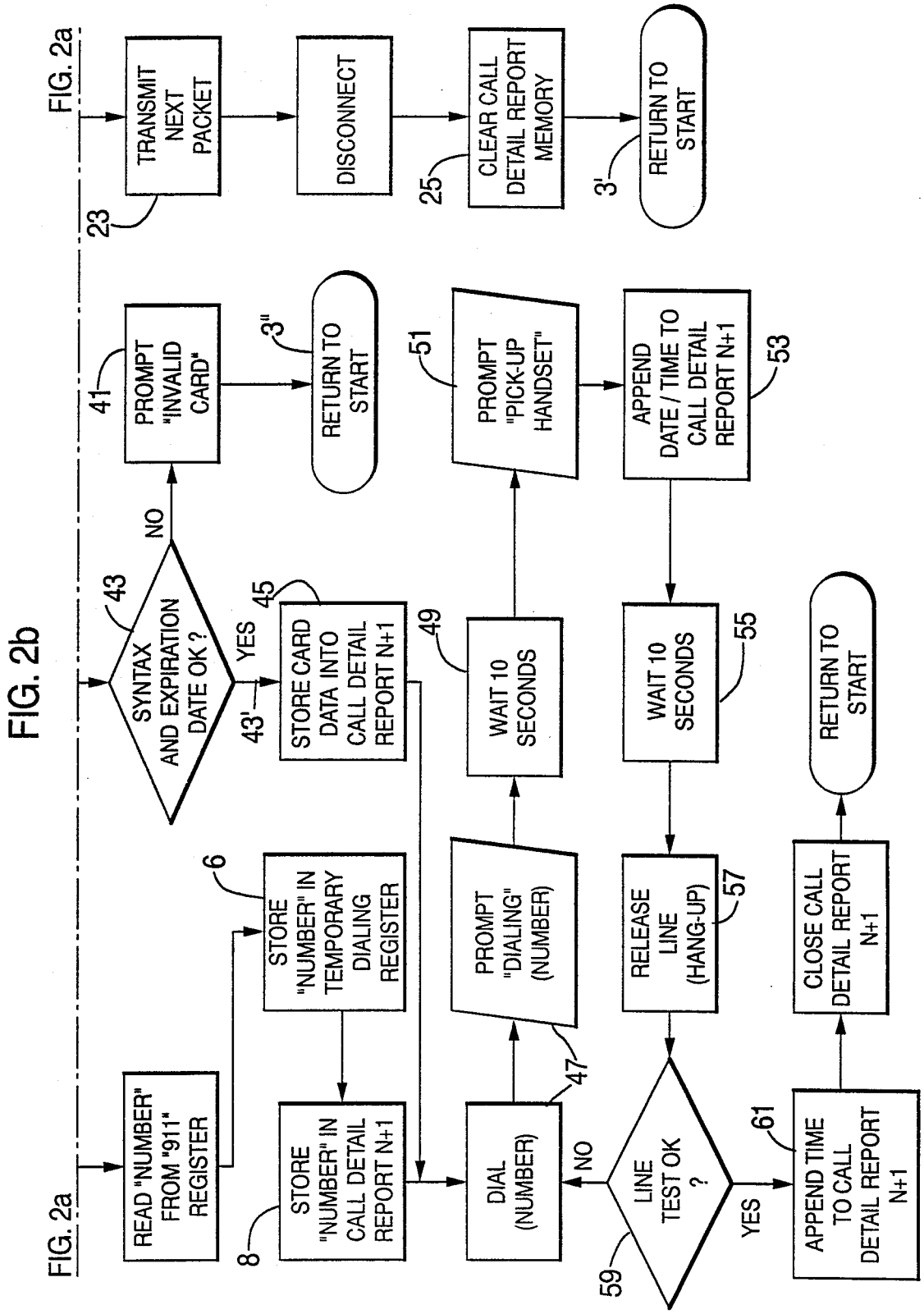

CREDIT/CALLING CARD PAY TELEPHONE METHOD AND SYSTEM EMPLOYING TELEPHONE UNIT LOCAL CARD-CHECKING AND OTHER INTELLIGENCE COOPERATIVE WITH LOCAL PERSONAL HOST COMPUTER

The present invention relates to so-called "pay telephone" systems and methods, being particularly concerned with credit/calling card utilization therewith.

Conventional calling card telephone systems involve simple telephones and call-processing centers. Typically, the center is an expensive, large, centralized telecommunications/computer facility. Regardless of the number dialed by the customer, the telephone automatically rings the remote processing center, either through a leased line or by dialing an inbound WATTS line. After connecting with the center, the telephone unit transmits the number the customer originally dialed and, upon receipt of that number, the center prompts for the customer's credit/calling card number, generally by sending a "bong" tone. After receiving the credit card number, the center validates the card number as legitimate and processes the call by accessing an outside line and dialing the customer's number. To determine call duration, the center monitors the line until the customer terminates the call. The center's computer then generates billing information based upon time of call initiation, duration, number dialed, and calling card number/customer identification. Systems of such and related character are described, for example, in U.S. Pat. Nos. 3,723,655; 3,727,186; and 3,982,103.

While it has also been proposed, as disclosed, for example, in U.S. Pat. No. 4,731,818, to store call information data at the telephone pay station including the credit card identification, the called number and the time, date and duration of the call, and then to transmit or down-load the stored data periodically at off times to a remote central billing computer upon request by such central billing computer, current pay telephone-credit card systems rely upon the above-discussed remote call-processing centers for credit/calling card validation, call particulars and duration tracking, and billing information generation. A local memory card reader for other uses is disclosed also in U.S. Pat. No. 3,696,335.

In accordance with the present invention, as contrasted from such conventional systems employing remote centralized and distributed intelligence, most of the necessary intelligence is shifted to the local telephone unit itself and requires only a local IBM-PC or similar class computer for a host and for billing generation. Among the purposes of the invention, thus, is to reduce substantially the cost of operating conventional credit/calling card telephone networks, with such cost savings being even more substantial in specialized applications such as in cellular pay telephone systems.

The method and system of the invention, moreover, provide virtually instantaneous call processing. After entering the number to be dialed, the customer is prompted to enter the calling card or credit card number, with the local unit determining the card's validity by checking its own self-contained database. If valid, the unit locally stores this information and immediately processes the call by out-dialing on any standard subscriber telephone line. Monitoring the line until terminated by the customer, the unit then locally stores card number, number dialed, date, time and duration as a "transaction record" into its non-volatile memory.

After a programmable number of calls, or period of time, or a combination of both, the unit itself automatically dials a local host computer with its own internal modem. Upon connection and after identifying itself with the telephone line number, the local telephone unit begins transmitting its transaction records in batches. Each record is sent with a Longitudinal Redundancy Check (LRC) code to guaranty error-free transmission of record data. Any interference results in automatic re-transmission until the transaction is error-free, with this entire transfer time occurring in seconds.

The local host PC, having received all the pertinent data concerning individual call detail records, then locally generates billing information, with charges calculated by comparing the individual unit telephone number with the charges or rates associated from that LATA (Local Area Transport Area) which are contained in the local PC database.

A further advantage of this technique resides in the facile provision of sophisticated remote maintenance functions. If a telephone unit equipped in accordance with the present invention has not reported transactions within a certain preset timeframe, for example, the PC will identify the potentially malfunctioning unit. Further, software and database updates can be made remotely to the telephone units, thereby eliminating maintenance visits by service personnel.

A most significant difference between the local intelligence telephone-PC host system of the invention and conventional systems is that no verification call is required; the telephone unit, for example, making but one 30-second call per day for reporting, whereas conventional systems require a call for every transaction. As before stated, the telephone unit itself may initiate such reporting and the final billing may be generated at the local PC. The cost of setting up the telephone network of the invention, furthermore, involves only an IBM-PC class host computer, for example, appropriate software and one intelligent telephone unit. Conventional systems, on the other hand, require hundreds of calling card telephones to be deployed in order to justify the cost of a major telecommunications/computer facility. Due to the significantly reduced operational costs of the system of the invention, moreover, relative profit margins can be increased to the owners and/or cost decreased to the customer.

Thus conventional pay telephone-credit card systems require mini-computers, major PBX facilities, fixed leased line/WATTS charges and relatively long connection times. The invention, in contrast, is micro-computer based, requires no PBX, uses standard subscriber lines, and provides fast connection times; the system of the invention being admirably applicable as a direct replacement for all conventional systems. It is, furthermore, particularly valuable in situations wherein dedicated leased lines are not feasible or are impossible, as in temporary installations. When equipped with a cellular radio-telephone interface, the system of the invention is capable of operation in such temporary installations, and in mobile settings as in, for example, trains, rental cars, taxi cabs, limousines and ferries.

Due to the on-board intelligence provided with the technique of the invention, many special features and functions may be provided that are beyond the limitations of standard telephones, including direct access to emergency numbers and to operator assistance; use with magnetic strip reading; programmable billing parameters; customized forms generation; specialized calling card support; down-loadable software updates; down-loadable data-base modifications; and customized customer prompting, among others.

It is therefore the principal object of the invention to provide a new and improved method of and system for credit/calling card telephone communication and processing residing in a new level of intelligence provided locally at the telephone unit in cooperation with a local PC host, for obviating the above-described and other limitations inherent in present-day calling card telephone systems.

Other and further objects will be explained hereinafter and are more particularly delineated in the appended claims.

In summary, from one of its broader aspects, the invention embraces a method of credit/calling card pay telephone communication, that comprises, providing local database, storage and programming intelligence at a telephone instrument unit for enabling virtually instantaneous call processing by the steps of locally prompting the user to enter credit/calling card number after dialing the number-to-be-called; locally checking card validity in self-contained local database; locally storing such information if checked as valid and immediately out-dialing the call on the telephone line; monitoring the line until the user terminates the call; locally storing the card number, number dialed, date, time and call duration as a transaction record of the call; automatically dialing a PC host computer through a local internal modem following one or both of a programmable number of calls or a predetermined time period; upon connection to the host computer, transmitting a batch of such transaction records to the host computer; and generating user billing information at said host computer, with the aid of the charged rate information stored in the computer local database. Preferred and best mode embodiment and design are later detailed herein.

Figure 3:
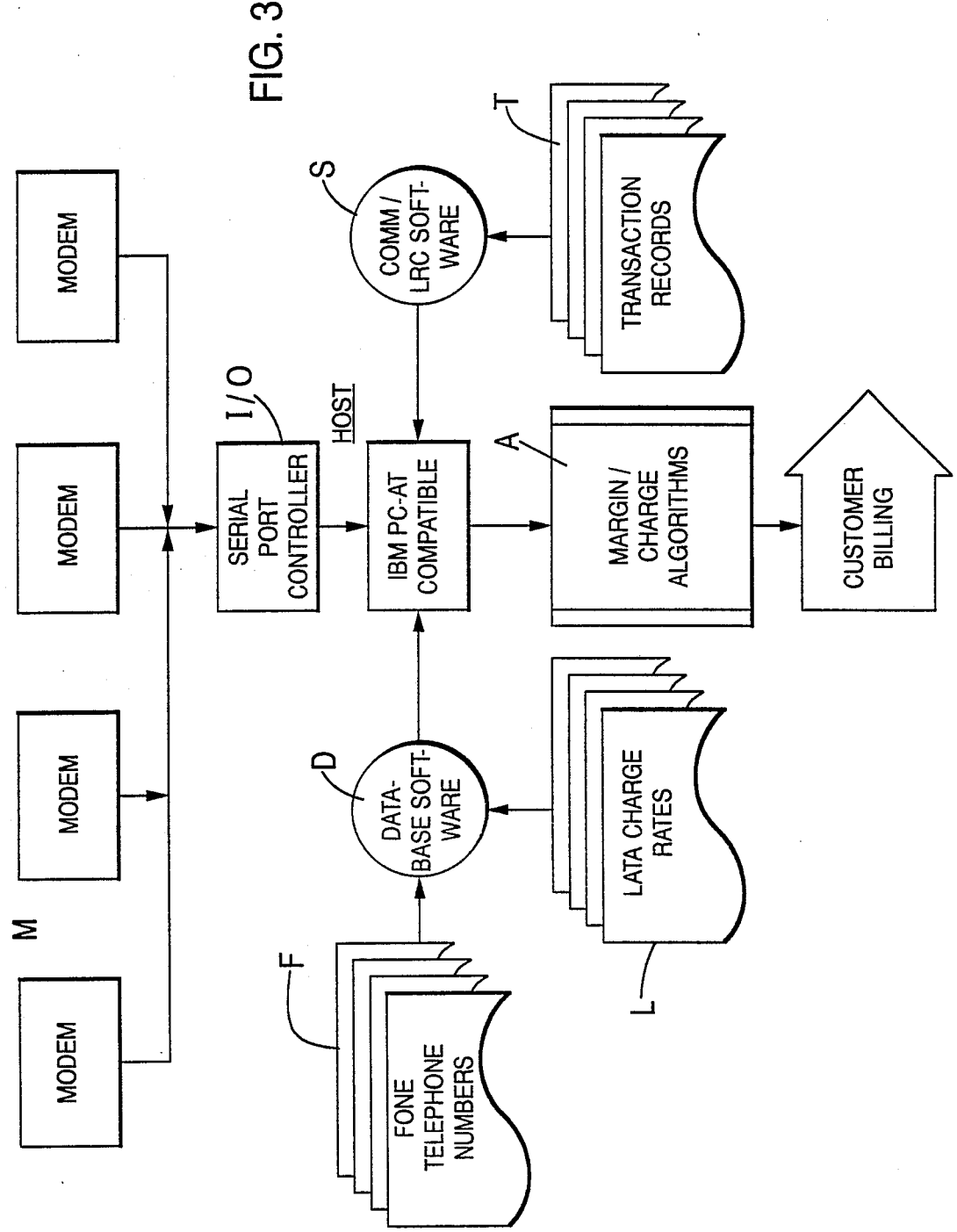

The invention will now be described with reference to the accompanying drawings, FIG. 1 of which is an isometric external view of a telephone unit constructed to embody the expanded intelligence system of the invention in a compact self-contained local handset type unit;

FIG. 2 is a block and flow chart diagram illustrating a preferred software implementation and control for practicing the invention; and FIG. 3 is a block diagram illustrating the modem and other interfacing with the local PC host computer in accordance with the invention.

Referring to FIG. 1, an actual prototype telephone handset 1 is shown, incorporating as part of the unit, a highly modified Credit Authorization Terminal (CAT) 2 containing the necessary local intelligence for practicing the invention, as before described. The CAT, which is normally used in point of sale credit card verification applications, has been modified to accept the addition of the microphone, speaker, and hook-sense electronics contained in the handset. Connected to the circuitry of the internal modem, the handset and "dialing" come under the control of the CAT microcontroller. Replacing the normal software used by the CAT in point of sale applications, is a program unique for call detail recording and processing usage of the invention as later described. Using an expanded version of the manufacturer's programming language, this software is responsible for data entry, prompting, processing, record management and reporting as will now be detailed in connection with the operational flow chart of FIG. 2.

Upon power-up at 3, FIG. 2, or end-of-call or upon the conclusion of data transfer, the local system of the invention at the telephone unit automatically clears its internal buffers and I/O ports at 5. It then tests for a valid telephone line presence at 7, which is critical, for example, in cellular telephone applications.

If the call detail report memory 9 is not full, a "System Ready" prompt 13 is displayed on the screen; but if the call detail report memory is full, a Reporting sequence is initiated. The Reporting sequence begins with sending a screen prompt "System Busy" 11, which informs users that the system is currently unavailable. After locking out the handset electronics which could otherwise interfere with data transfer should a user attempt to use it, the internal modem dials the number programmed as HOST 15. Unsuccessful connection to the HOST results in a programmable re-try sequence 17. Continued failure results in a "locked condition" in which the unit waits for the next power-up routine at 3.

After successful handshaking with the HOST's modem, later described in connection with FIG. 3, the system transmits its first call detail report 19. This report 19 is a packet of information containing unit ID, telephone number, and the actual transaction record. Appended to the packet is the computed LRC value of the preceding data. This is received by the HOST which recomputes the LRC value of the data portion of the packet. If the LRC computed by the HOST is equal to the LRC transmitted by the telephone unit, the HOST transmits an ACK signal at 21; if the value is not equal, the HOST transmits a NAK at 21'. If the telephone unit receives back such a NAK, or does not receive an ACK within a pre-programmed period of time, the packet is retransmitted a programmable number of times. If unable to complete the transfer process, all of the call detail records are retained until the next power-up event at 3, in which then another attempt is made. The telephone unit will retain the complete report memory and essentially disallow further user operation until cleared.

Upon receipt at the telephone unit of an ACK at 21, it indexes to the next report 23 and repeats the cycle. Upon successful completion of reporting, the system clears its call detail report memory and returns to the power-up routine at 3'-3.

If, after power-up, the telephone unit detects a valid line and the call detail report memory is not full, a "System Ready" prompt 13 is displayed and it then waits for input from the keyboard 29 which can initiate either primary or secondary routines. Such a primary routine is initiated by pressing the number 1 key for credit card or calling card dialing at 29. The user is then prompted with "ENTER PHONE NUMBER" 31 and waits for keyboard input. Storing the number in the call detail report memory N+1 at 33, the unit then also stores this number into a temporary dialing register 35. The unit then prompts "SCAN CARD or ENTER CARD #" 37 (effected by the user or customer passing the magnetic stripe portion of, for example, a credit card along the longitudinal reader guide 3 of FIG. 1) and awaits keyboard or magnetic strip reader input 39 from such reading.

The unit then checks the validity of the card or calling card number by comparing its coded value with known allowable values stored in a small database at 43. If the number is not of proper sequence, or of expired data or disallowed card type, the prompt "INVALID CARD/NUMBER" is displayed at 41 and the unit returns to start at 3". If valid, the data is placed via 43' into the call detail record memory 45. In the case of credit cards, this data includes card type, expiration date, customer ID, etc. The internal modem then dials the number and prompts "DIALING XXXXXX" at 47. After a programmable wait period 49 determined by local service access delays (touch-tone, dial-pulse, or cellular) the unit then prompts "Pick-Up Handset" at 51. The date and time of the call are then appended to the call detail record N+1 at 53 and, after programmable wait period 55 to allow for connection, the unit releases the line from its internal modem to control by the user handset. While prompting "HANG-UP WHEN DONE" 57, the unit tests the line at 59 for a call in progress until the user hangs up, the called party hangs up, or a no-service condition exists. It then appends the time of completion to call detail report N+1 at 61, closes that report and returns to start.

Secondary calling routines 4 are provided to invoke a variety of functions such as emergency dialing (911-Police), operator assistance, information services, etc. Each routine can be customized for a particular area and/or system operator/owner (for example, the before-mentioned "911", with number storage in temporary dialing register 6 and call detail report N+1 at 8). These routines involve the same process of primary calling routines with the exception of bypassing the credit/calling card validation and storage portions 41–45.

Turning, now, to the PC host computer component of the invention, such HOST, FIG. 3, is comprised of modems M, HOST software S, and, for example, an IBM-PC class micro-computer, so-labelled. The system can be expanded to include up to 32 modems, an 80386 based super-micro, and multiple serial I/O ports. No on-line processing is involved, and the ultimate capacity is limited only by the operating system. The HOST software can also be ported to UNIX/XENIX based systems for extremely large network populations. Alternatively, owners can gradually expand their PC-based operations by simply adding additional PC systems networked together via a LAN. The number of modems M and the capabilities of the micro-computer is determined solely by the number of telephone units in service. A network of 100 such intelligent telephone units, for example, would only necessitate one modem and a low-cost IBM-PC compatible.

The HOST software S is a communications program developed to facilitate application development. It manages modem status and configuration, receives incoming data, performs LRC error checking, sends NAKs and ACKs, before-described, and saves the transaction reports T into individual ASCII files. These files can then be accessed by numerous commercial database management packages for manipulation and processing as is well known. In addition to transaction files, the data base manager D would access other files containing individual FONE UNIT data F (telephone number and installation location), LATA charge rate structure L, and owner/operator billing algorithms A. The output of the HOST system, moreover, can be flexibly configured to produce printed invoices for direct customer billing, and magnetic tape, or batch up-loads via modem to credit card processing services.

Further modifications will occur to those skilled in the art and such are considered to fall within the spirit and scope of the invention as defined in the appended claims.

What is claimed is:

1. A method of credit/calling card pay telephone communication, that comprises, providing local database, storage and programming intelligence at a telephone instrument unit for enabling virtually instantaneous call processing by the steps of locally prompting the user to enter credit/calling card number after dialing the number-to-be-called; locally checking card validity in self-contained local database; locally storing such information if checked as valid and immediately out-dialing the call on the telephone line; monitoring the line until the user terminates the call; locally storing the card number, number dialed, date, time and call duration as a transaction record of the call; at the telephone instrument unit, automatically initiating dialing a PC host computer through a local internal modem following one or both of a programmable number of calls or a predetermined time period; upon connection to the host computer, transmitting a batch of such transaction records to the host computer; and generating user billing information at said host computer, with the aid of the charged rate information stored in the computer local database.

2. A method as claimed in claim 1 and in which the transmission of said batch of such transaction records is effected together with a longitudinal redundancy check code.

3. A method as claimed in claim 1 and in which the further step is performed, if the telephone instrument unit has not reported transaction records to the host computer for a preset timeframe, of identifying such unit as a potentially malfunctioning unit.

4. A method as claimed in claim 1 and in which said host computer provides updating software and database information to the telephone instrument unit.

5. A credit/calling card pay telephone communication system having in combination with a telephone handset instrument unit comprising microphone, speaker and hook-sense electronics, locally disposed software, data base and storage means comprising a local credit authorization terminal and including internal modem means and microcontroller means for controlling the handset unit and the dialing thereof; said software providing for local data entry, user prompting, local card verification, call processing, call record management and call transaction reporting; and PC host computer means modem-connected to said system for receiving periodic reports automatically initiated by the telephone instrument unit itself from said unit of batches of calls, including dialed numbers and respective card numbers, date, time and call duration; and means at said host computer means for generating user billing information; and in which said unit software, database, storage and credit authorization terminal mans performs the following sequence of functions: clearing internal buffers and I/O ports; testing for valid telephone line presence and memory space; handshaking through said modem with the host computer means; responding to entry of user-dialed number-to-be-called with a prompt for application of the card information to the unit; checking validity of card number with locally stored database information, and, if valid, entering data as to card type, number or identity; dialing out the number-to-be-called on said telephone line and appending date and time of call to a call detail record; following a programmed wait period to allow for calling and called telephone unit connections, releasing said line from the internal modem control to the calling user handset; and, upon hang-up, appending time of completion of call to said report; and storing the call transaction report.

6. A system as claimed in claim 5 and in which means is provided at said unit for automatically initiating the transmission to the host computer means of the said periodic reports.

7. A system as claimed in claim 6 and in which the report initiating means is controlled by one or both of a programmed number of calls at said unit or a predetermined time period.

8. A system as claimed in claim 5 and in which means is provided for enabling secondary calling routines such as emergency dialing and operator assistance bypassing the credit/calling card validation and storage.

9. A system as claimed in claim 5 and in which said PC host computer means is provided with communications program software means for managing modem status and configuration, receiving incoming data from said unit, performing longitudinal redundancy error checks, sending acceptance signals to said unit for call transaction report transmission from said unit, and filing such reports as received.

10. A system as claimed in claim 8 and in which said host computer means further is provided with database management means having access to files of telephone and installation numbers, local charge rate structures and owner/operator billing algorithms, enabling the generation therefrom of customer or user billings.

11. A method as claimed in claim 1 and in which the further step is provided of enabling the user to enter the credit/calling card number after dialing the number-to-be-called at the user's option either by credit card magnetic stripe scan or by dialing the card number.

* * * * *